UNITED STATES PATENT OFFICE.

OSCAR KJELLBERG, OF GOTTENBORG, SWEDEN.

PREPARING ELECTRODES FOR ELECTRIC WELDING OR SOLDERING.

1,115,317.      Specification of Letters Patent.     Patented Oct. 27, 1914.

No Drawing.     Application filed January 29, 1912. Serial No. 674,167.

*To all whom it may concern:*

Be it known that I, OSCAR KJELLBERG, citizen of Sweden, residing at Gottenborg, in the country of Sweden, have invented new and useful Improvements in Preparing Electrodes for Electric Welding or Soldering, of which the following is a specification.

This invention is for improvements in or relating to electric welding or soldering. In my previous U. S. A. Patent No. 948764, dated Feb. 8, 1910, I have described a method and apparatus for welding or soldering metals electrically. Since the date of that patent I have investigated many details of that process and apparatus leading to particularly beneficial results. For example, I have discovered compositions of materials particularly suitable for the formation of the cover of partly fireproof and normally practically non-conducting material, that is to say the second class conductor in which the welding or soldering metals is incased.

I have also discovered particular methods by which mechanical, chemical and physical advantages may be imparted to the metal, thus forming the weld or solder by the addition of certain ingredients to the material of which the cover is made.

Dealing first with the normal action of the cover or sheath the desirable qualities aimed at are:—(1) That the cover shall generally form a crater at the operating end of the rod of welding or soldering metal, that is to say, that the edges of the cover shall project a short distance beyond the end of the rod while the process is in operation. (2) That the edges of the crater shall be automatically removed as the rod of metal diminishes in length so that the form of the crater shall remain the same during the process of welding or soldering. (3) That the cover shall in certain cases be consumed in the same proportion as the welding material, without forming a crater, as for example when welding or soldering level surfaces, whereby the cover may be made so thin that it falls off without forming a crater, as well as when the cover, to suit certain work, contains such materials as alkalis or reducing materials which burn or are consumed at a lower temperature than that which exists at the working end of the electrode during the operation. (4) That the material constituting the cover shall form a thin sleeve of slag around the metal which is being projected from the rod on to the work so that the molten metal is protected from the action of the air and is inclosed as it were in a little crucible in which any chemical reactions take place. For these purposes it is advisable to use different thicknesses of sleeve for different operations. For ordinary level welding, that is to say, where the rod can be held with its operating point downward, the cover can be comparatively thin as stated above, the cover dropping off without forming a crater. For welding vertical joints the cover is made somewhat thicker and for welding joints from underneath, that is to say, when the operating point of the rod is upward, the cover has to be still thicker that is to say it has to be sufficiently thick to perform satisfactorily the above-mentioned functions.

The producing of the cover takes place in the following manner: The ingredients are crushed and all mixed together in a finely powdered state and pure water or other suitable liquid, as spirits or the like, is added until, while being constantly stirred, the mixture attains the consistency of a thin paste. The electrode metal which takes the form of a thin metal rod is dipped in the paste until a cover of the desired thickness surrounds the rod entirely or partly, supposing the welding materials to be iron, a rod of say 5 mm. it acquires for level welding a coating up to $\frac{1}{2}$ mm., for welding vertically up to 1 mm. and for welding on the underside up to 2 mm. The cover having been applied, the rods are dried, standing in an inclined position; carbonic acid is now developed and its evolution renders the cover somewhat porous and brittle. When the cover is dry the rods are ready to be used as electrodes. Such part of the cover, as may project beyond the end of the rod, is removed in order that the working end of the rod may obtain proper contact with the object to be welded.

The ingredients of the cover may for example be as follows:—250 grams crushed limestone ($CaCO_3$), 90 grams carbonate of potassium ($K_2CO_3$), 60 grams zirconium-oxid ($ZrO_2$), 10 grams carbon (C), 75 grams magnesium-oxid (MgO), 15 grams silicate of alumina ($HAlSiO_4$). One or more of the above ingredients may also be substituted by suitable proportions of dolomite, bauxite, china-clay, carbids, etc. To the ingredients named some acid or similar body adapted to develop carbonic acid from the ingredients should be added. Such body might for instance comprise 100 grams $KNaSiO_3$ and 120 grams $B_2O_3$.

The most suitable temperature of the water for the paste is 15–20° C. The drying should be done at a temperature of 20–30° C. If a higher temperature is used, so much carbonic acid will be developed that the cover drops off, while if the temperature is too low, the cover does not become sufficiently porous.

In order to get the claimed developing of the carbonic acid at the stated temperatures during the manufacture of the electrodes and also to accumulate carbonic acid in the finally dried cover somewhat more of any suitable substance containing carbonic acid may be added.

In cases where it is desirable to increase the percentage of carbon in the molten metal, or to develop reducing gases in the sleeve of slag during the welding operation, more carbon may be added to the paste, either as pulverized pure carbon, or as any other substance, as carbids, which in the arc develop hydrocarbons or carbon monoxid or other reducing gases.

Should it be necessary to increase phosphorus and sulfur in the molten metal, the carbon may be added as charcoal made from the wood of foliferous trees, as it contains more of these substances than pine wood. Bone-charcoal in a pulverized state is also suitable for this purpose. Charcoal from pine wood is to be preferred if a pure material is required.

In order to facilitate the forming of slag and to give the weld the desired percentage of silicon, the paste should contain from 30–140 grams $KNaSiO_3$ in a finely powdered state, or corresponding silicate-combination with calcium, aluminium or other earth metals, or ferro-silicon.

To prevent irregular and dry peeling off from taking place (in use) as the working end of the welding rod melts and expands a certain toughness in the cover is necessary. For this purpose a proportion of a boron compound such as $B_2O_3$ or $BCl_3$, for instance 150 grams of $B_2O_3$ may be added.

It must be observed that during the process those parts of the cover, which have affinity for the iron or steel, unite therewith in melting, while previously and at the same time exercising a reducing influence, as well as getting reduced themselves.

Depending upon the demands made on the weld, the nature of the substances constituting the cover varies. If for instance it is desirable to introduce manganese, the paste is mixed with manganese (Mn) in powdered state, for instance as ferromanganese (spiegeleisen) or manganese-peroxid or manganite or braunite or other manganese compound: for instance 50 grams $MnO_2$.

For the welding of nickel-steel is added nickel in the form of $Ni_2O_3$ or powdered nickel or for welding of chrome steel chromium in the shape of powdered ferrochrome or $Cr_2Cl_6$ or $FeOCr_2O_3$ is added; or for the welding of steel containing molybdenum, molybdenum in the form of $MoO_3$ of pulverized ferromolybdenum is introduced, these powders being of the kind usually found in the market.

In the case of soft steel, vanadium in the form of pulverized ferrovanadium, of the ordinary kind, is added, and when the weld is desired to be specially able to withstand corrosion, ferro-titanium in the form of pulverized $FeOTi_2O_3$ or other suitable titanium compound is used.

It is clear that several other combinations of the above substances can in varying proportions be used under the same or other conditions, and the materials mentioned are selected merely as examples.

Sometimes it might be suitable to prepare two pastes, one of which contains those materials by which it is desired to supply to the welding material the required constituents, and the other which contains such materials which form the sleeve of slag. In this case the metal rod will be dipped into the first-mentioned paste and then after this coating is dried, into the second-mentioned paste, or vice-versa.

In every case hitherto mentioned where steel or iron is to be welded the original welding metal may preferably consist of:

| | |
|---|---|
| Fe | 99.440% |
| C | 0.100% |
| Si | 0.150% |
| Mn | 0.300% |
| P | 0.001% |
| S | 0.009% |
| | 100.000% | which has proved to be a useful composition. Many other compositions are also suitable, according to circumstances.

The rod can be of any desired shape, even hollow or a tube may be used, wherein the substances that are to give the weld the proper chemical composition, are contained, either as a dried paste or pulverized and well mixed together. The tube may also be covered in the way already mentioned. The slag forming substances may also be contained in the interior of the tube and the other ingredients around the same or vice-versa.

It has been ascertained that in the electric arc an iron or steel rod generally undergoes the following chemical change.

|  | Steel. | | Iron. | |
| --- | --- | --- | --- | --- |
|  | Before welding. | After welding. | Before welding. | After welding. |
| Fe | 98.72 | 99.40 | 99.10 | 99.58 |
| C | 0.60 | 0.32 | 0.25 | 0.11 |
| Si | 0.03 | 0.00 | 0.10 | 0.02 |
| Mn | 0.52 | 0.26 | 0.30 | 0.12 |
| S | 0.05 | 0.01 | 0.14 | 0.09 |
| P | 0.08 | 0.01 | 0.11 | 0.08 |
|  | 100.00 | 100.00 | 100.00 | 100.00 |

If therefore metal rods are used, composed with reference to the above-mentioned reductions, the cover can be practically non-conducting both in normal condition and at the high temperature it receives during the operation, and the cover can be made acid, neutral or basic, depending on the chemical or physical composition of the object to be treated. In these cases the cover does not need to form a crater.

Exhaustive trials have proved that carbon, silicon and manganese increase the hardness of the applied metal in different ways according to their proportions.

The amount of carbon, silicon and manganese in the cover or sleeve can be calculated according to the amount which is lost in the slag in the form of gas, or otherwise. Thus the cover contains between 4 and 40 grms. of carbon, between 3 and 30 grms. of silicon and 2 to 12 grms. of manganese per kilo of iron or steel in the electrode. The above weights refer to the pure substance.

From this description it is possible either (a) by means of proper substances, contained in the cover, to obtain the required chemical composition, strength and tenacity in the added metal, (b) or keeping in mind the reducing influence of the arc, to give the steel or iron rods used in welding certain work, such a composition that the weld gets the desired chemical composition, strength and tenacity. If therefore the composition and strength of the metal, which is to be welded, is known, it is possible, according to (a) and (b) to make a weld of practically the same composition which, as regards strength is within ± 2 kilograms per square millimeter of the strength of the original material.

The strength of a metal depends principally upon its chemical composition. By changing, for example, the proportions of carbon in the steel, the strength of the material will be varied within certain limits.

The influencing of the strength by working of the material is of course open to be treated with this invention as well as with usual treating of iron and steel, but that will not reduce the important influence on the strength caused by the composition itself. When the heat is sufficiently high, as, for example, in an open hearth furnace, some part of the materials from the lining will always be reduced and carried over into the melt. That forms as known the characteristic difference between acid and basic steel. The very same result is obtained by this invention, with only the slight difference that the cover which here represents the lining will be fully consumed in the same degree as the electrode melts.

By the method herein the electric arc acts accurately as an open hearth furnace fired electrically.

Having now particularly described and ascertained the nature of my said invention and in what manner the same is to be performed, I declare that what I claim is:—

1. The herein described method of manufacturing electrodes for welding or soldering metals electrically, which consists in mixing together in a finely powdered state carbonates, carbon, oxides and silicates with a liquor and a carbonic acid developing material to a thin paste, dipping therein an iron rod until the same is coated with the paste, and leaving the coated rod to dry while standing in an inclined position thereby developing carbonic acid from the rod cover.

2. The herein described method of manufacturing electrodes for welding or soldering metals, which consists in mixing together in a finely powdered state $CaCO_3$, $K_2CO_3$, $ZrO_2$, $MgO$, $C$, $KNaSiO_2$, $B_2O_3$ and $HAl\,SiO_4$ with a liquor to a paste, dipping therein an iron rod until it is coated with the paste and leaving the coated rod to dry.

3. The herein described method of manufacturing electrodes for welding or soldering metals electrically, which consists in mixing together in a finely powdered state carbonates, carbon, oxides and silicates with a liquor and a dual combination of silicates with earth metals substantially as set forth to a paste, dipping therein an iron rod until it is coated with the paste, and bringing about drying of the coated rod.

4. The herein described method of manufacturing electrodes for welding or soldering metals electrically, which consists in mixing together in a finely powdered state carbonates, carbon, oxids and silicates with a liquor, a carbonic acid developing material and substances which form ingredients of the metal to be treated, to a paste, dipping therein an iron rod until the same is coated with the paste, and bringing about drying of the coated rod.

In testimony whereof I have hereunto set my hand in presence of two subscribing witnesses.

OSCAR KJELLBERG.

Witnesses:
 E. JOHNSON,
 ERIC MIDHOLM.